(12) United States Patent
Lissianski et al.

(10) Patent No.: US 10,465,631 B2
(45) Date of Patent: Nov. 5, 2019

(54) SYSTEM FOR GENERATING AN IMPROVED H2:CO RATIO IN SYNGAS AND AN ASSOCIATED METHOD THEREOF

(71) Applicant: General Electric Company, Schenectady, NY (US)

(72) Inventors: Vitali Victor Lissianski, Schenectady, NY (US); Adam Edgar Klingbeil, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 15/400,975

(22) Filed: Jan. 7, 2017

(65) Prior Publication Data

US 2018/0195466 A1    Jul. 12, 2018

(51) Int. Cl.
*F01N 3/00*    (2006.01)
*F02M 25/022*   (2006.01)
*F02M 25/035*   (2006.01)

(52) U.S. Cl.
CPC ...... *F02M 25/0225* (2013.01); *F02M 25/035* (2013.01)

(58) Field of Classification Search
CPC ... C10J 3/86; C10J 2300/165; F02M 25/0225; F02M 25/035
USPC .......................................................... 60/274
See application file for complete search history.

(56) References Cited

U.S. PATENT DOCUMENTS

| 4,965,052 A | 10/1990 | Lowther et al. |
| 8,109,078 B2 | 2/2012 | Johannes et al. |
| 9,169,773 B2 | 10/2015 | Bromberg et al. |

(Continued)

FOREIGN PATENT DOCUMENTS

| GB | 799818 A | 8/1958 |
| JP | 2002060763 A | 2/2002 |

(Continued)

OTHER PUBLICATIONS

Lissianski, Vitali Victor, et al.; "System for Generating Syngas and an Associated Method Thereof"; Pending U.S. Appl. No. 15/085,409, filed Mar. 30, 2016; 28 Pages.

(Continued)

*Primary Examiner* — Jason D Shanske
(74) *Attorney, Agent, or Firm* — Frank A. Landgraff; Hoffman Warnick LLC (57) ABSTRACT

A system and method for generating an improved syngas are disclosed. The system includes a mixing unit, a heat exchanger, an engine and a water gas shift (WGS) reactor. The mixing unit is configured to mix a hydrocarbon fuel, an oxidant, and water to generate a fuel mixture. The heat exchanger is coupled to the mixing unit and configured to receive the fuel mixture and generate a heated fuel mixture. The engine is coupled to the heat exchanger and configured to receive the heated fuel mixture and generate an exhaust syngas. The WGS reactor is coupled to the engine and configured to receive the exhaust syngas and provide a water gas shift reaction of the hydrogen, carbon monoxide and the water vapor in the exhaust syngas to provide a reduction in a level of carbon monoxide in the exhaust syngas and an increase in a level of hydrogen in the exhaust syngas to generate the improved syngas.

27 Claims, 8 Drawing Sheets

(56) References Cited

U.S. PATENT DOCUMENTS

| | | | |
|---|---|---|---|
| 2008/0022680 A1* | 1/2008 | Gingrich | F01N 13/107 |
| | | | 60/605.2 |
| 2008/0202121 A1* | 8/2008 | Nagel | F01K 21/04 |
| | | | 60/670 |
| 2010/0313840 A1 | 12/2010 | Day et al. | |
| 2014/0148520 A1* | 5/2014 | Lissianski | C10G 2/34 |
| | | | 518/712 |
| 2014/0374660 A1* | 12/2014 | Bromberg | C01B 3/366 |
| | | | 252/373 |
| 2017/0284295 A1* | 10/2017 | Lissianski | F02C 3/30 |

FOREIGN PATENT DOCUMENTS

| | | | |
|---|---|---|---|
| WO | 2007094702 A1 | 8/2007 | |
| WO | 2010131943 A1 | 11/2010 | |

OTHER PUBLICATIONS

Edwards et al., "Exploration of a Fuel Cell/Internal Combustion Engine Combined Cycle for High Efficiency Power Generation (A GCEP Exploratory Project)", pp. 07.

Lim et al., "The engine reformer: Syngas production in an engine for compact gas-to-liquids synthesis", The Canadian Journal of Chemical Engineering, vol. 94, Issue: 4, pp. 623-635, Apr. 2016.

* cited by examiner

SYSTEM FOR GENERATING AN IMPROVED H2:CO RATIO IN SYNGAS AND AN ASSOCIATED METHOD THEREOF

BACKGROUND

Embodiments of the present disclosure relate to a fuel conversion system, and more particularly to a syngas production system used in such fuel conversion system.

With increased availability and stable prices of natural gas (NG), there is greater emphasis on using such fuels to effectively convert such fuels into alternative fuels. Gas to Liquid (GTL) technologies become one such viable option to produce liquid fuels from the NG. This option is of even greater importance with the world-wide drive to reduce NG flaring from oil production. Until recently GTL on small scale was not considered economical due to the high capital expenditure (CAPEX) and technical challenges with the technology scaling down.

In GTL systems syngas production sub-systems are used to produce a gas stream containing hydrogen and carbon monoxide (hereinafter also referred as "syngas") from conventional fuels such as natural gas, coal, and biomass. The syngas production systems may include gasifiers, steam reformers, and the like. Syngas production contributes ~40% to the total cost of medium scale and ~60% to the cost of small-scale GTL plants.

This disclosure is related to syngas production using fuel-rich NG combustion in an internal combustion engine using oxygen enriched air or pure oxygen as an oxidizer.

When diesel and gasoline are produced from syngas, an optimum ratio of $H_2$:CO in the syngas is 2:1. If the $H_2$:CO ratio is less than 2:1, some amount of CO will not be converted to liquid products. To produce syngas with the desired $H_2$:CO ratio, a GTL system engine would have to operate at Phi=3. Typically, combustion time in a spark ignition engine is limited to a few milliseconds. This residence time may not be sufficient for complete natural gas conversion to syngas. As a result, exiting engine syngas may have a $H_2$:CO ratio of less than 2:1.

Accordingly, there is a need for an improved syngas production system and an associated method for generating syngas with a desired $H_2$:CO ratio.

BRIEF DESCRIPTION

These and other shortcomings of the prior art are addressed by the present disclosure, which includes a system for generating an improved $H_2$:CO ratio in syngas and an associated method thereof.

In accordance with one exemplary embodiment, a system for generating a syngas is disclosed. The system includes a mixing unit, a heat exchanger coupled to the mixing unit, an engine coupled to the heat exchanger, and a water gas shift (WGS) reactor coupled to the engine. The mixing unit is configured to mix a hydrocarbon fuel, an oxidant and water to generate a fuel mixture. The heat exchanger is coupled to the mixing unit and configured to receive the fuel mixture and evaporate the water by heating the fuel mixture, using a hot fluid, to generate a heated fuel mixture. The engine is coupled to the heat exchanger and configured to receive the heated fuel mixture and generate an exhaust syngas comprised of hydrogen, carbon monoxide and water vapor by partially combusting the heated fuel mixture. The water gas shift (WGS) reactor is coupled to the engine and configured to receive the exhaust syngas and provide a water gas shift reaction of the hydrogen ($H_2$), carbon monoxide (CO) and the water vapor in the exhaust syngas to provide a reduction in a level of carbon monoxide (CO) in the exhaust syngas and an increase in a level of hydrogen ($H_2$) in the exhaust syngas to generate an improved syngas. The improved syngas has a higher hydrogen ($H_2$) to carbon monoxide (CO) ratio ($H_2$:CO ratio) than the exhaust syngas.

In accordance with another exemplary embodiment, a system for generating a syngas is disclosed. The system includes a mixing unit, a heat exchanger coupled to the mixing unit, a heat exchanger coupled to the mixing unit, an engine coupled to the heat exchanger, and a water gas shift (WGS) reactor coupled to the engine. The mixing unit is configured to mix a hydrocarbon fuel, an oxidant and water to generate a fuel mixture. The heat exchanger is coupled to the mixing unit and configured to receive the fuel mixture and evaporate the water by heating the fuel mixture, using a hot fluid, to generate a heated fuel mixture. The engine is coupled to the heat exchanger and configured to receive the heated fuel mixture and generate an exhaust syngas comprised of hydrogen, carbon monoxide and water vapor by partially combusting the heated fuel mixture, wherein the exhaust syngas has a hydrogen ($H_2$) to carbon monoxide (CO) ratio ($H_2$:CO ratio) less than 2:1. The water gas shift (WGS) reactor is coupled to the engine and configured to receive the exhaust syngas and provide a water gas shift reaction of the hydrogen ($H_2$), carbon monoxide (CO) and the water vapor in the exhaust syngas to provide a reduction in a level of carbon monoxide (CO) in the exhaust syngas and an increase in a level of hydrogen ($H_2$) in the exhaust syngas to generate an improved syngas. The improved syngas has a hydrogen ($H_2$) to carbon monoxide (CO) ratio ($H_2$:CO ratio) of at least 2:1.

In accordance with one exemplary embodiment, a method for generating an exhaust syngas is disclosed. The method includes mixing a hydrocarbon fuel, an oxidant and water in a mixing unit, to generate a fuel mixture, evaporating the water by heating the fuel mixture, using a hot fluid in a heat exchanger, to generate a heated fuel mixture, generating an exhaust syngas in an engine by partially combusting the heated fuel mixture in an engine and generating an improved syngas in a water gas shift (WGS) reactor by providing a water gas shift reaction of the hydrogen ($H_2$), carbon monoxide (CO) and the water vapor in the exhaust syngas to provide a reduction in a level of carbon monoxide (CO) in the exhaust syngas and an increase in a level of hydrogen ($H_2$) in the exhaust syngas. The improved syngas has a higher hydrogen ($H_2$) to carbon monoxide (CO) ratio ($H_2$:CO ratio) than the exhaust syngas.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

DRAWINGS

These and other features and aspects of embodiments of the present disclosure will become better understood when the following detailed description is read with reference to the accompanying drawings in which like characters represent like parts throughout the drawings, wherein.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about."

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

As used herein, the singular forms "a", "an", and "the" include plural referents unless the context clearly dictates otherwise.

Embodiments discussed herein disclose a system, for example, a fuel conversion system including a syngas production system. The syngas production system provides syngas having an improved $H_2$:CO ratio. In such embodiments, the syngas production system is configured to generate a syngas from fuels such as natural gas and oxygen enriched air. In certain embodiments, the natural gas is a hydrocarbon fuel such as methane and the like. The term "oxygen air" refers to a mixture of oxidant ($O_2$) and nitrogen. In certain embodiments, the oxygen air may additionally include steam. The catalytic converter is configured to convert the syngas into a liquid fuel such as gasoline, diesel, methanol, and the like. In certain exemplary embodiments, the syngas production system is configured to mix the natural gas, oxidant, and water in a mixing unit to generate a fuel mixture. The fuel mixture is heated using a heat exchanger so as to evaporate the water and generate a heated fuel mixture including the natural gas and oxygen air. The syngas production system includes an engine, for example, an internal combustion engine, to partially combust the heated fuel mixture to generate the syngas. The hydrogen to carbon monoxide molar ratio in the syngas (may also be referred to "a quality of the syngas") produced from the engine may be increased by increasing fuel to oxygen ratio and maintaining a predefined concentration of steam in the fuel mixture. During combustion of the fuel mixture, the presence of steam improves the ratio of hydrogen to carbon monoxide molar ratio in the syngas. To further improve the ratio of hydrogen to carbon monoxide in the syngas, the system further includes a water gas shift (WGS) reactor. Certain engine operating conditions and composition of the combustion mixture may require adjustment for the reaction in the WGS to proceed. Accordingly, applying back pressure on the engine, varying fuel to oxygen ratio by introducing oxygen into the fuel-air mixture near the engine spark plug, introducing additional hydrogen to the intake mixture by recycling the tail gas from the catalytic process or portions of the syngas, increasing an inlet temperature of the fresh intake mixture, and/or removing the turbocharge from the engine, may be utilized to provide such adjustments.

Figure 1:
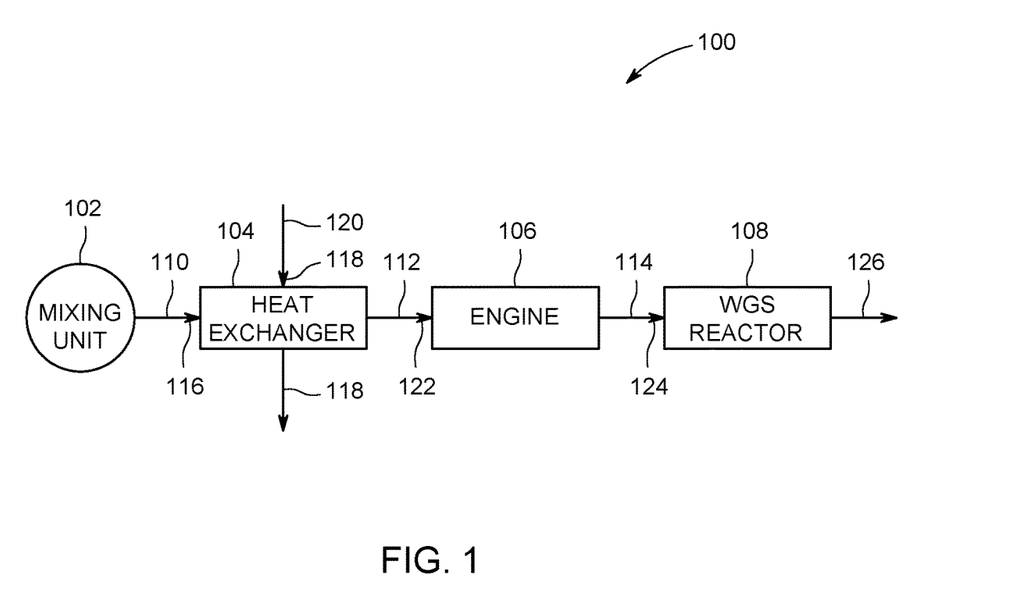
FIG. 1 is a block diagram of a syngas production system in accordance with one or more embodiments shown or described herein.

FIG. 1 illustrates a block diagram of a system 100, for example, a syngas production system in accordance with one exemplary embodiment. The syngas production system 100 includes a mixing unit 102, a heat exchanger 104, an engine 106 and a water gas shift (WGS) reactor 108. The mixing unit 102 is coupled to the heat exchanger 104 via a channel 110. The heat exchanger 104 is coupled to the engine 106 via an intake manifold 112. The engine 106 is coupled to the WGS reactor via an intake manifold 114.

The mixing unit 102 is configured to mix a hydrocarbon fuel, an oxidant, and water and generate a fuel mixture 116. In one embodiment, the hydrocarbon fuel is natural gas such as methane. In some other embodiments, the hydrocarbon fuel may include refinery gas, landfill gas, associated petroleum gas, and the like. Similarly, the oxidant is enriched oxygen having a substantially low percentage of other components such as nitrogen and the like. In certain embodiments, the oxidant includes a mixture of oxygen and nitrogen. In such embodiments, an amount of oxygen in the oxidant is in a range of 50 percent to 95 percent.

The fuel mixture 116 may be a moist fuel mixture having a pre-defined ratio of fuels, for example, 40 to 60 percent of methane, 30 to 40 percent of oxidant, and 10 to 20 percent of water. In one or more embodiments, the pre-defined ratio of the fuels in the fuel mixture 116 may be varied based on an operating condition of the heat exchanger 104, the engine 106 and the WGS reactor 108. In one or more embodiments, a control unit (not shown) may be used to control the feed of fuels to the mixing unit 102 to vary the pre-defined ratio of the fuels.

Figure 2:
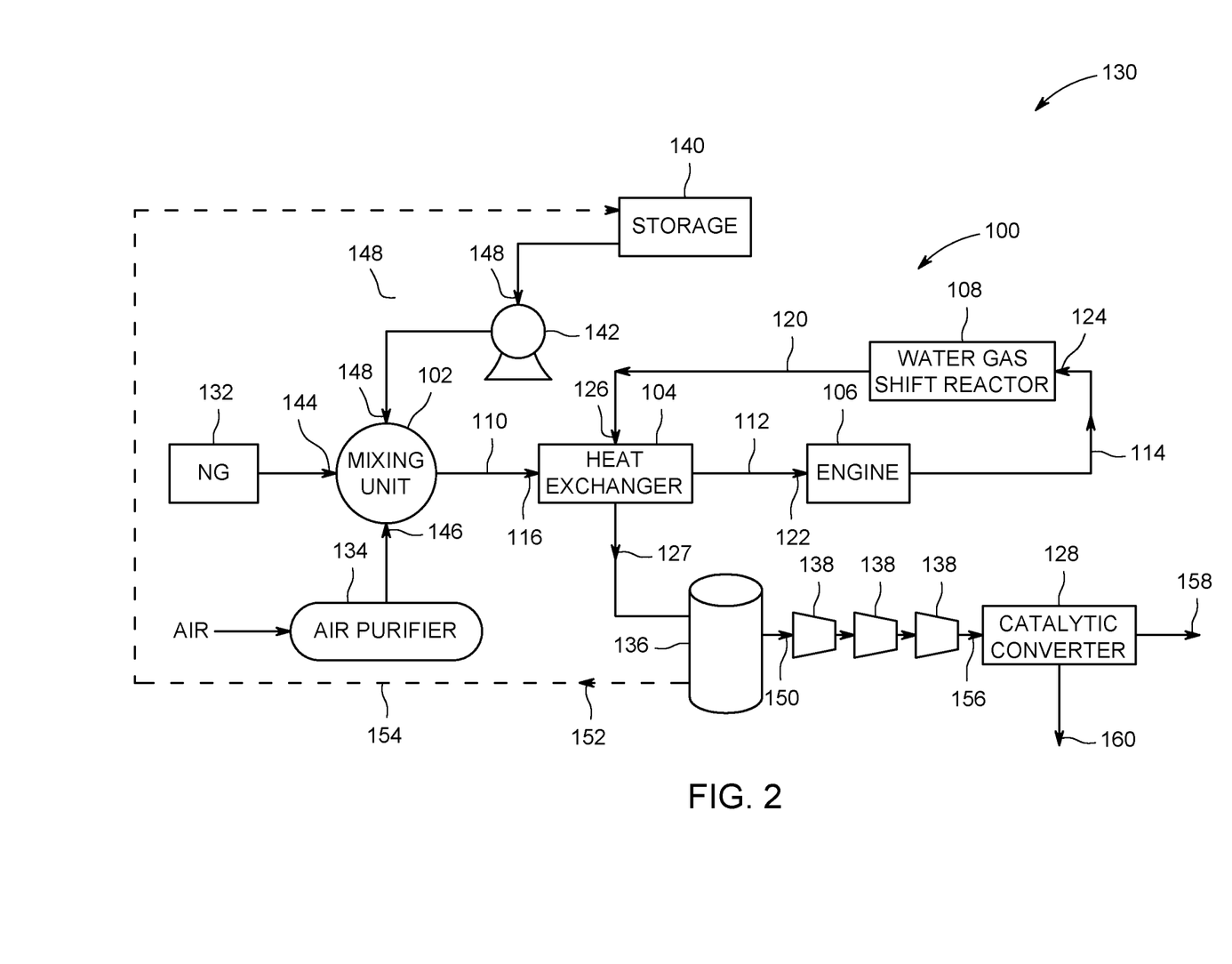
FIG. 2 is a block diagram of a fuel conversion system including a syngas production system, in accordance with one or more embodiments shown or described herein.

The heat exchanger 104 is configured to receive the fuel mixture 116 from the mixing unit 102 via the channel 110. Further, the heat exchanger 104 is configured to receive a hot fluid 118 via a manifold 120. In one embodiment, the heat exchanger 104 is a shell and tube heat exchanger. In such embodiments, the heat exchanger 104 may include a bundle of tubes (not shown in FIG. 1) disposed within a chamber (not shown in FIG. 1). The bundle of tubes is coupled to the channel 110 and the chamber is coupled to the manifold 120. The chamber is configured to receive the hot fluid 118 from the manifold 120 and heat the fuel mixture 116 circulated within the bundle of tubes to evaporate the water content (i.e. vaporize the water to produce steam) of the fuel mixture 116 and generate a heated fuel mixture 122. In one embodiment, the hot fluid 118 is an exhaust syngas, and more particularly the exhaust syngas 124 as illustrated in FIG. 2 and described presently, which is generated from the engine 106 (described presently). In some other embodiments, the hot fluid 118 may be a flue gas or exhaust gas generated or received from a furnace, a boiler, a steam generator, and the like. In one embodiment, the heated fuel mixture 122 is maintained at a temperature range from 100 to 220 degrees Celsius. The pressure of the heated fuel mixture 122 may be in a range from 1 to 10 bars. In one specific embodiment, the heated fuel mixture 122 is a mixture of the hydrocarbon fuel and the oxygen air. As previously stated, the term "oxygen air" refers to a mixture of the oxidant and nitrogen. In certain embodiments, the oxygen air may additionally include steam.

The engine 106 is configured to receive the heated fuel mixture 122 via the intake manifold 112. In one embodiment, the engine 106 is an internal combustion engine, for example, a spark ignition engine configured to generate an exhaust syngas 124. The engine 106 is configured to compress the heated fuel mixture 122 during a compression stroke and ignite the compressed heated fuel mixture 122 during a power stroke to partially combust the heated fuel mixture 122 and generate the exhaust syngas 124. Partial combustion refers to fractional combustion of the hydrocarbon fuel such as methane in presence of relatively small amount of oxidant. In certain embodiments, the ratio of the oxidant in the heated fuel mixture 122 may be regulated to prevent complete combustion (i.e. oxidation) of the hydrocarbon fuel in the heated fuel mixture 122, thereby, preventing formation of high percentage of carbon dioxide.

In one or more embodiments, the fuel mixture 116 generated from the mixing unit 102, is a diluted fuel mixture. As a result, a temperature of the engine 106 and heat released from the heated fuel mixture 122 are controlled during the combustion of the fuel mixture 116. Hence, a stable operating condition for the engine 106 is generated. Further, the presence of steam in the heated fuel mixture 122 may increase the hydrogen content in the exhaust syngas 124 by water gas shift reaction of the heated fuel mixture 122, thereby improving the hydrogen to carbon monoxide molar ratio in the exhaust syngas 120.

The WGS reactor 108 is configured to receive the exhaust syngas 124 via the intake manifold 114. In one embodiment, the WGS reactor 108 provides for a water gas shift reaction of carbon monoxide and water vapor in the exhaust syngas 124 to provide a further reduction in the level of carbon monoxide and an increase in hydrogen in the exhaust syngas 124. The WGS reactor 108 is configured to provide the $H_2$:CO ratio as described herein and generate an improved syngas 126.

FIG. 2 illustrates an embodiment of a fuel conversion system 130 including the syngas production system 100 of FIG. 1. The fuel conversion system 130 includes adjustments to the syngas production system 100, and more particularly the engine operating conditions to improve the reaction in the WGS. The conversion system 130 is integrated with a Fischer-Tropsch (FT) process, and more particularly includes a catalytic converter 128, for production of gasoline diesel, methanol, and/or other valuable products, in accordance with one exemplary embodiment.

As discussed previously, the syngas production system 100 includes the mixing unit 102, the heat exchanger 104, and the engine 106. The syngas production system 100 further includes a hydrocarbon fuel source 132, an air purifier 134, a condenser 136, a plurality of compressors 138, of which three compression stages are illustrated, a water storage unit 140, and a pump 142.

The mixing unit 102 is coupled to the hydrocarbon fuel source 132, the air purifier 134, and the pump 142. The hydrocarbon fuel source 132 may be a storage unit configured to store a hydrocarbon fuel 144 such as methane. The hydrocarbon fuel source 132 is configured to feed the hydrocarbon fuel 144 to the mixing unit 102. The air purifier 134 is configured to receive air and separate an oxidant 146 from the air. In certain embodiments, the oxidant 146 is enriched oxygen having a relatively small percentage of other components such as nitrogen and the like. The air purifier 134 is further configured to feed the oxidant 146 to the mixing unit 102. The pump 142 is further coupled to the water storage unit 140 and configured to feed water 148 to the mixing unit 102. In one embodiment, the mixing unit 102 is a batch processing device which is configured to receive the pre-defined ratio of the hydrocarbon fuel 144, the oxidant 146, and the water 148 and produce the fuel mixture 116. In certain other embodiments, the mixing unit 102 is a continuous processing device which is configured to continuously receive the pre-defined ratio of the hydrocarbon fuel 144, the oxidant 146, and the water 148 and produce the fuel mixture 116. In some embodiments, an amount of the hydrocarbon fuel 144 in the fuel mixture 116 exceeds a stoichiometric amount of the hydrocarbon fuel 144 in a range of 2 to 4. In one embodiment, a stoichiometric molar ratio of the hydrocarbon fuel 144 to the oxidant 146 is 1:2. In such embodiments, the fuel mixture 116 may undergo complete combustion (i.e. oxidation), thereby producing carbon dioxide and hydrogen. In order to prevent complete combustion, the stoichiometric molar ratio of the hydrocarbon fuel 144 to the oxidant 146 is maintained in range from 2:2 to 4:2 so as to partially combust the fuel mixture 116 to generate the syngas. Similarly, in some other embodiments, an amount of the water 148 in the fuel mixture 116 is within a range of 10 percent to 30 percent.

As discussed previously in the embodiment of FIG. 1, the heat exchanger 104 is configured to receive the fuel mixture 116 from the mixing unit 102 via the channel 110 and the improved exhaust syngas 126 from the WGS reactor 108 via the manifold 120. Further, the heat exchanger 104 is configured to evaporate the water 148 by heating the fuel mixture 116, using the exhaust of the improved ratio syngas 126, to generate the heated fuel mixture 122. In one embodiment, the heat exchanger 104 is configured to heat the fuel mixture 116 to a temperature in a range from 50 degrees Celsius to 500 degrees Celsius prior to partially combusting the heated fuel mixture 116 in the engine 106. The engine 106 is configured to receive the heated fuel mixture 122 from the heat exchanger 104 via the intake manifold 112. Further, the engine 106 is configured to partially combust the heated fuel mixture 122 to generate the exhaust syngas 124. In an embodiment, the exhaust syngas 124 includes the molar ratio from 1.2:1 to 1.8:1 of hydrogen and carbon monoxide. To further improve the molar ratio of hydrogen and carbon monoxide to the desired ratio of 2:1, the WGS reactor 108 is configured to receive the exhaust syngas 124 and generate the improved ratio syngas 126 having the desired 2:1 molar ratio of hydrogen and carbon monoxide.

The WGS reactor 108 is coupled to the condenser 136 via the manifold 120. Specifically, the manifold 120 extends from the WGS reactor 108 to the condenser 136 through the heat exchanger 104. The improved ratio syngas 126 heats the fuel mixture 116 in the heat exchanger 104 before being fed to the condenser 136 as a cooled improved ratio syngas 127. In some embodiments, the improved ratio syngas 126 may be further cooled in an air cooler before being fed to the condenser 136.

The condenser 136 is configured to receive the cooled improved ratio syngas 127 from WGS reactor 108 and the heat exchanger 104 via the manifold 120. The condenser 136 is configured to generate a separated improved ratio syngas 150 and condensed water 152 from the cooled improved ratio syngas 127 by a condensation process. The condenser 136 is further coupled to the plurality of compressors 138 and configured to feed the separated improved ratio syngas 150 to the plurality of compressors 138. The condenser 136 is also coupled to the water storage unit 140 via a recirculation channel 154. The condenser 136 is further configured to feed the condensed water 152 to the water storage unit 140. The water storage unit 140 is coupled to the mixing unit 102 via the pump 142. The pump 142 is configured to pump the water 148 from the water storage unit 140 to the mixing unit 102.

The plurality of compressors 138 are configured to receive the separated improved ratio syngas 150 from the condenser 136 and compresses the separated improved ratio syngas 150 to produce a pressurized separated improved ratio syngas 156. In the illustrated embodiment, the plurality of compressors 138 are not directly coupled to the engine 106. The plurality of compressors 138 are coupled to the engine 106 via the condenser 136. In such a configuration, the plurality of compressors 138 may perform relatively small amount of work because the compression process involves compressing only the separated improved ratio syngas 150 and not the cooled improved ratio syngas 127 including the condensed water 152.

The catalytic converter 128 is coupled to the plurality of compressors 138 and configured to receive the pressurized separated improved ratio syngas 156 from the plurality of compressors 138. In one embodiment, the catalytic converter 128 is a Fischer-Tropsch converter. The catalytic converter 128 is configured to perform a plurality of catalytic reactions to convert the pressurized separated improved ratio syngas 156 having carbon monoxide and hydrogen to a liquid fuel 158 and a tail gas 160. In some embodiments, the liquid fuel 158 includes liquid hydrocarbons such as gasoline, diesel, methanol, naphtha, paraffin, and the like and the tail gas 160 includes lighter hydrocarbons and hydrogen. In certain embodiments, a plurality of additional steps, such as purification of the pressurized separated improved ratio syngas 156 may be performed before supplying the pressurized separated improved ratio syngas 156 to the catalytic converter 128 to avoid degradation and poisoning of the catalyst used in the catalytic converter 128.

As previously stated, certain engine operating conditions and the composition of the fuel mixture 116 may require adjustment for the reaction in the WGS reactor, such as WGS reactor 108 of FIGS. 1 and 2, to proceed. The adjustments may include applying back pressure on the engine, as described and illustrated below with respect to FIG. 3, varying fuel to oxygen ratio by introducing oxygen into the fuel-air mixture near the engine spark plug, as described and illustrated below with respect to FIG. 4, introducing additional hydrogen to the intake mixture by recycling the tail gas or portions of the syngas, as described and illustrated below with respect to FIGS. 5 and 6. Additionally, removing a turbocharge from the engine, if present, may be utilized to provide such adjustments. Example fuel conversion systems including a turbocharge, as well as additional component such as generators, recirculation channels, and the like, are provided in commonly assigned, bearing U.S. patent application Ser. No. 15/085,409, by Lissianski et al., entitled, "System for Generating Syngas and an Associated Method Thereof," which is incorporated by reference herein in its entirety.

Figure 3:
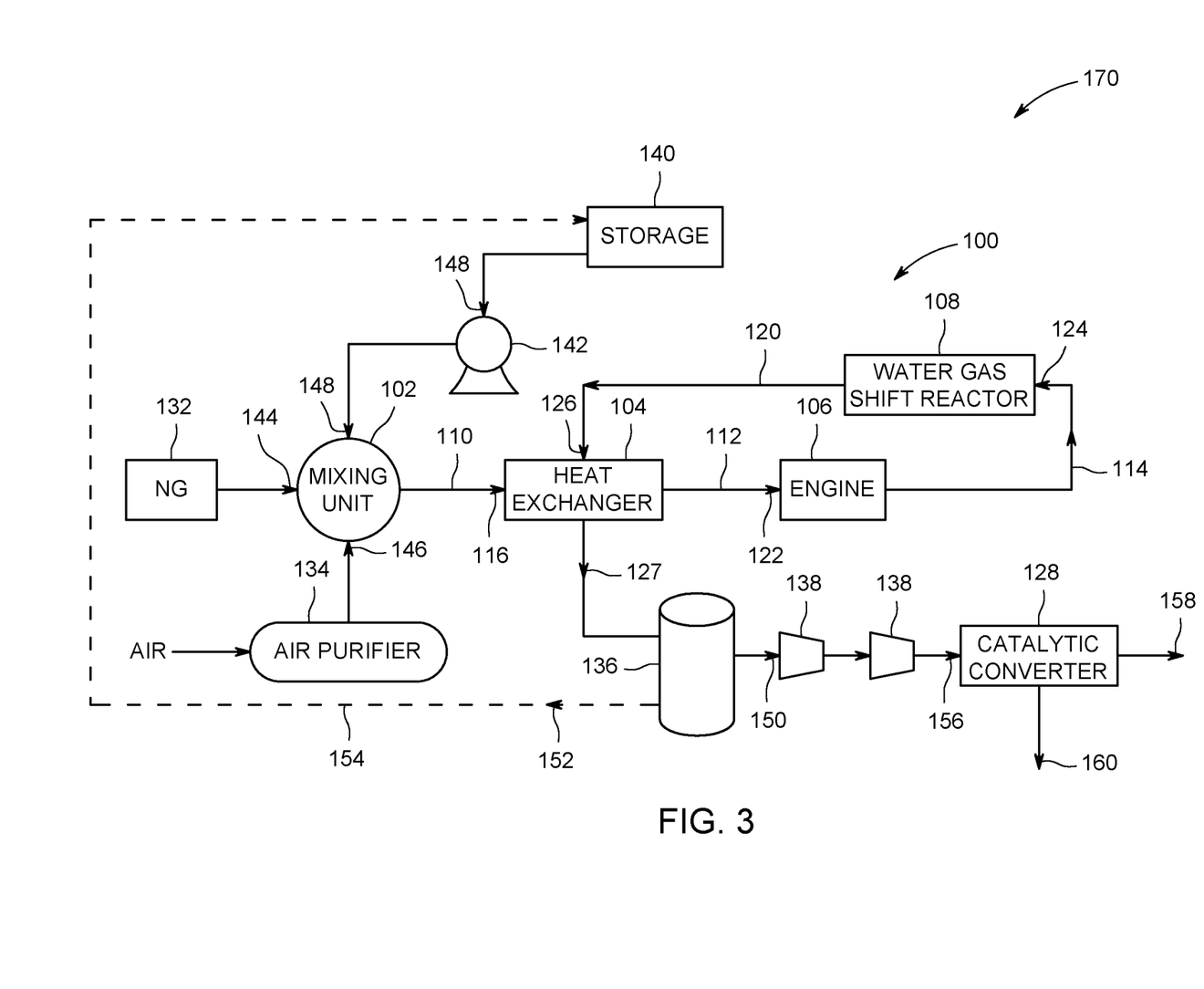
FIG. 3 is a block diagram of another embodiment of a fuel conversion system including a syngas production system, in accordance with one or more embodiments shown or described herein.

FIG. 3 illustrates a block diagram of a fuel conversion system 170 including the application of back pressure to the engine 106, in accordance with one exemplary embodiment. In the illustrated embodiment, the syngas production system 100 includes a plurality of compressors 138, which in this particular embodiment, and in contrast to the embodiment of FIG. 2, includes only two compression stages.

In a typical fuel conversion system, syngas exiting the engine is slightly above atmospheric pressure. A compressor, such as compressors 138, are used to compress the syngas to about 25 atm, which is the typical syngas pressure required for catalytic conversion of syngas to liquid products. A syngas compressor with compression ratio of 25 typically requires a 3 or 4-stage compressor, similar to the plurality of compressors 138 of FIG. 2, illustrating three compressor stages. This required number of syngas compressors is bulky and expensive. In an attempt to decrease the size of the compressor 138 in a system including the WGS reactor 108, such as fuel conversion system 170, applying back pressure on the engine 106 such that engine exhaust is at 4-8 atm pressures may reduce the number and size of required compressors 138. By applying back pressure on the engine 106, the engine 106 serves as a first compression stage in the integrated system engine-compressor. Applying back pressure on the engine 106 reduces the engine power output. Thus, back pressure has to be optimized to make sure that engine produces sufficient power for the process components including the air purifier 134, the plurality of syngas compressors 138, and the catalytic converter 128. The increasing exiting engine syngas pressure will also impact the performance of the WGS reactor 108. Therefore, all system components including the engine 106, the WGS reactor 108 and the plurality of compressors 138 require optimization for best performance.

Figure 4:
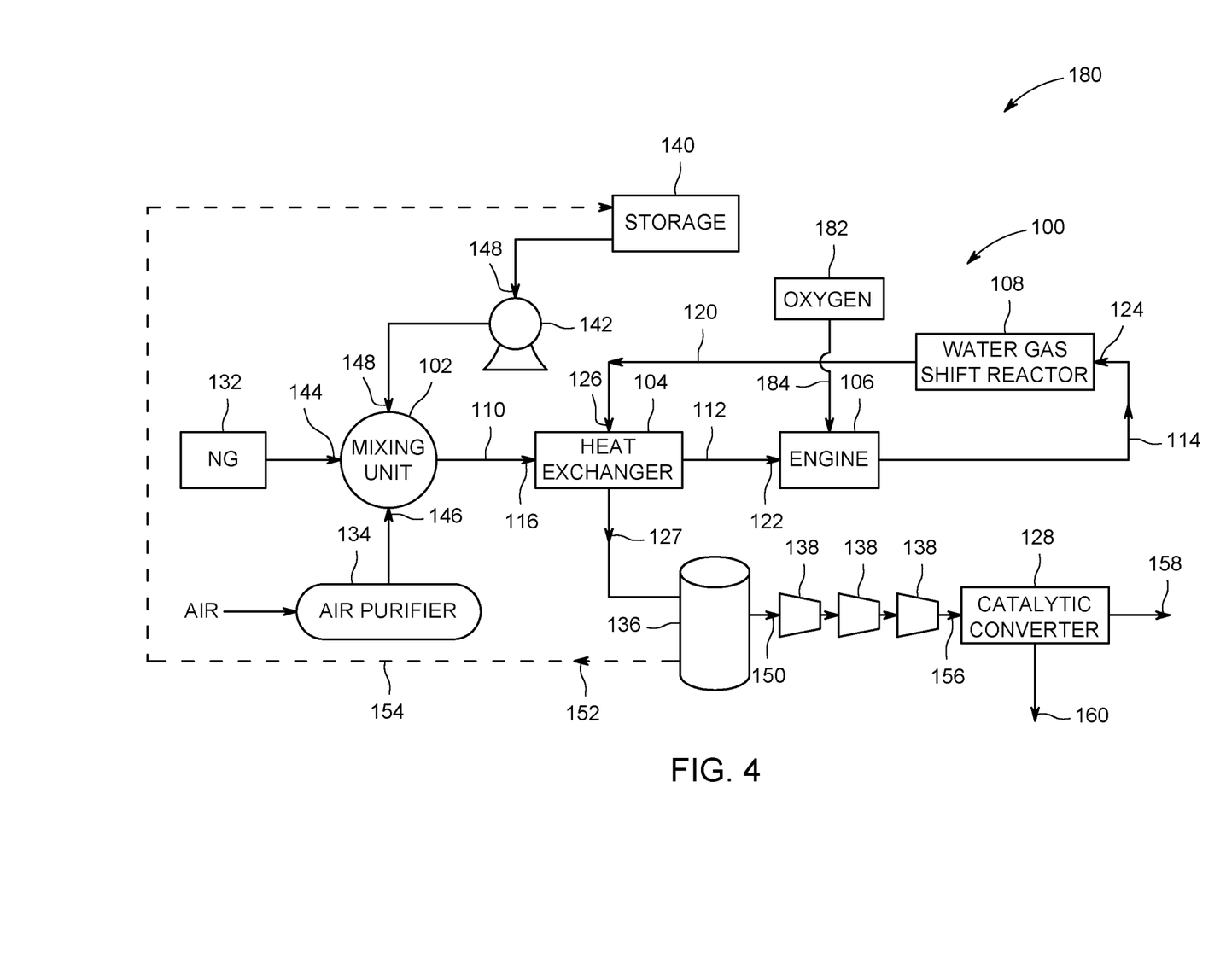
FIG. 4 is a block diagram of another embodiment of a fuel conversion system including a syngas production system, in accordance with one or more embodiments shown or described herein.

FIG. 4 illustrates a block diagram of fuel conversion system 180 including the injection of oxygen ($O_2$) to the engine 106, in accordance with one exemplary embodiment. In the fuel conversion system 180, and more particularly the syngas production system 100 including the WGS reactor 108, ignition may be a challenge for the system 100 due to the fuel rich operating conditions. To address such issue, in the illustrated embodiment of FIG. 4, the syngas production system 180 provides for varying the fuel to oxygen ratio by introducing a slipstream of oxygen into the heated fuel-air mixture 122 near an engine spark plug (not shown). Accordingly, the syngas production system 100 further includes a source of oxygen 182. The source of oxygen 182 may be a storage unit configured to store oxygen 184 or the air purifier 134. The source of oxygen 182 is configured to feed the oxygen 184 to the engine 106. The engine 106 is configured to receive the oxygen 184. The oxygen 184 is provided in a slip stream to a spark plug pre-chamber (not shown) to provide that the heated fuel mixture 122 in the pre-chamber is operating closer to a stoichiometric point whereby substantially all of the oxygen in the heated fuel mixture 122 is consumed and all of the fuel in the heated fuel mixture 122 is burned, so as to generate an energetic flame which then ignites the remainder of the fuel-rich heated fuel mixture 122.

Figure 5:
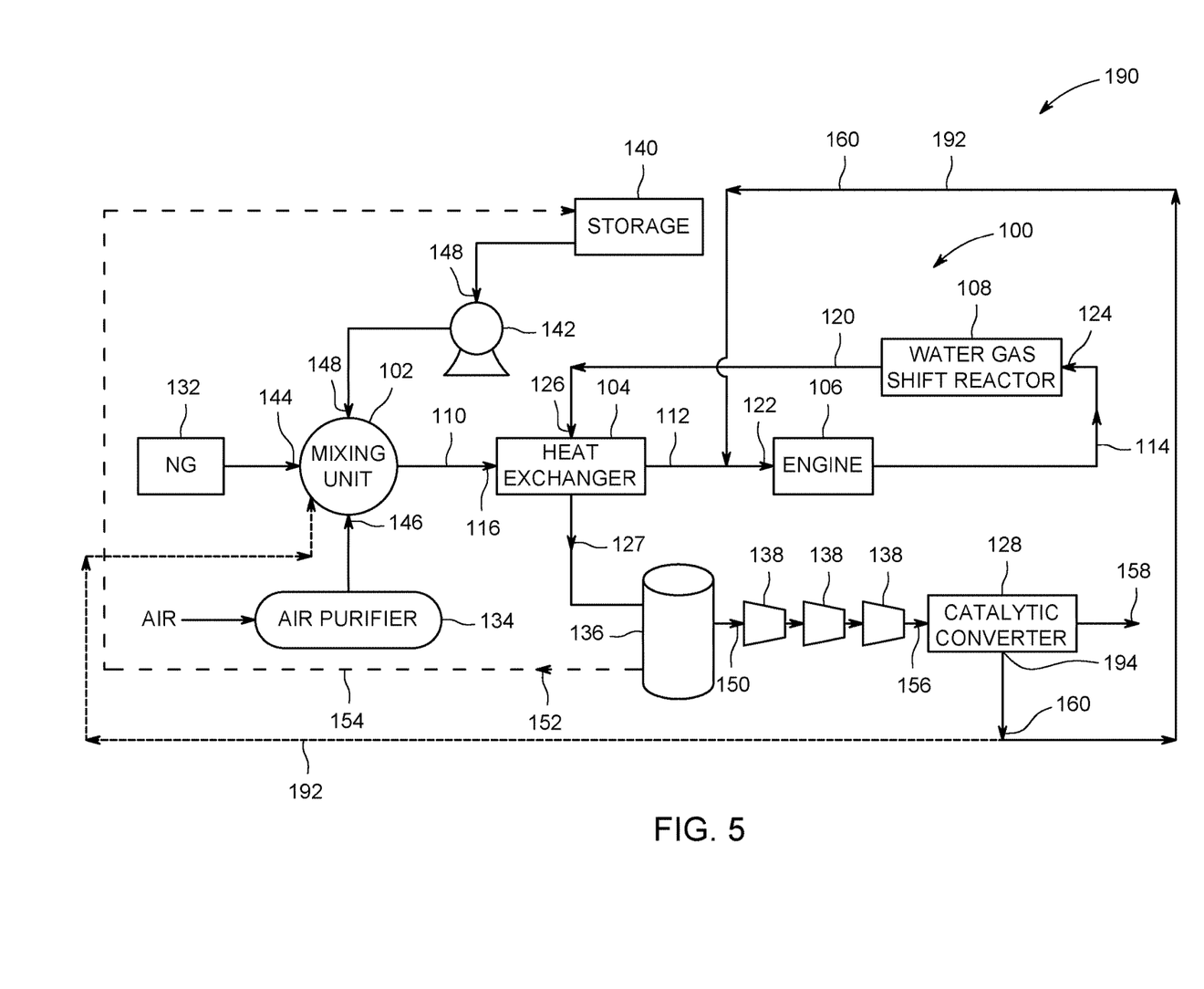
FIG. 5 is a block diagram of another embodiment of a fuel conversion system including a syngas production system, in accordance with one or more embodiments shown or described herein.
Figure 6:
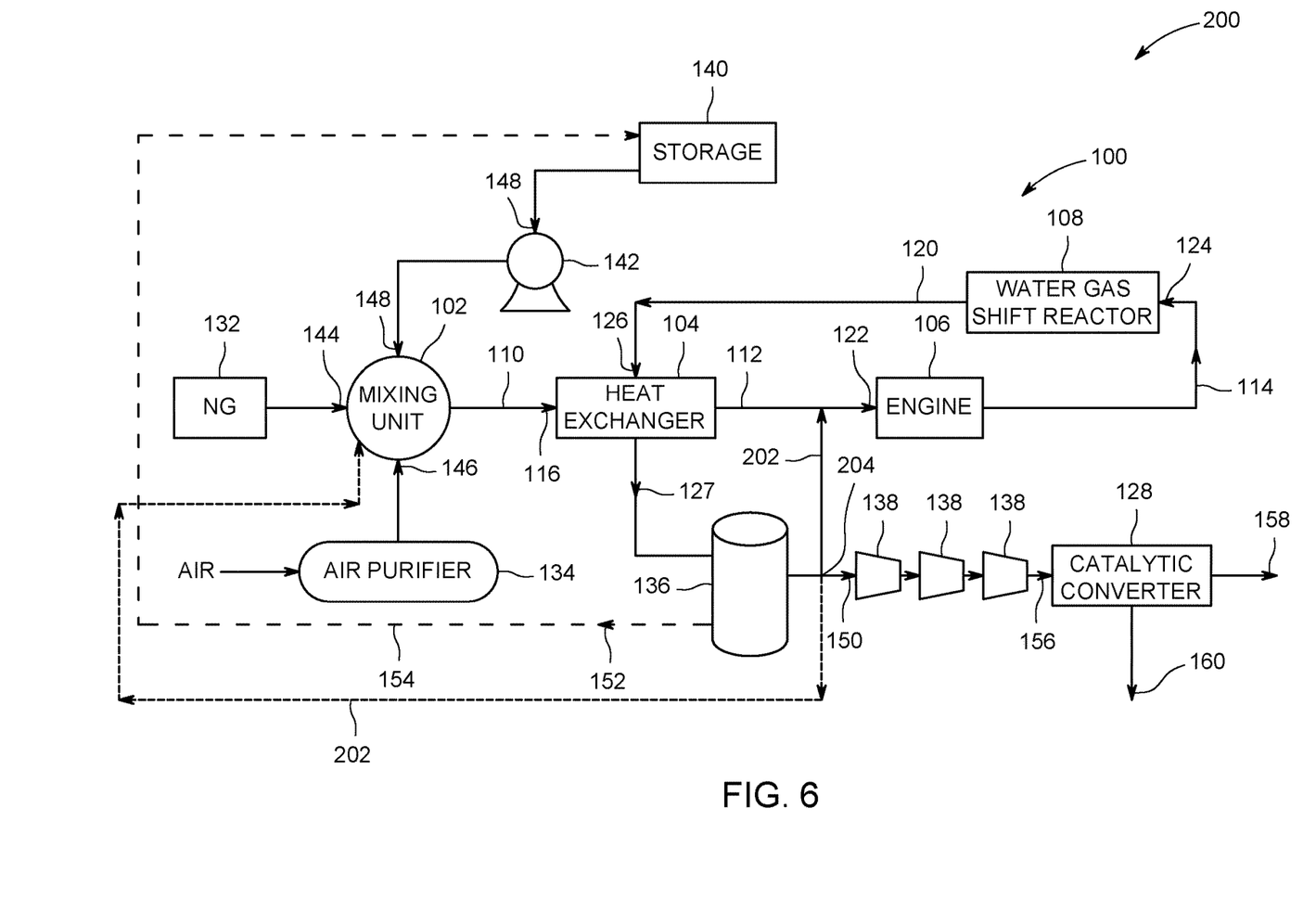
FIG. 6 is a block diagram of another embodiment of a fuel conversion system including a syngas production system, in accordance with one or more embodiments shown or described herein.

FIGS. 5 and 6 illustrate block diagrams of fuel conversion systems 190, 200, respectively, including hydrogen recirculation, in accordance with one exemplary embodiment. Prior art has shown that the addition of hydrogen to the heated fuel mixture 122 with air as an oxidant will allow the engine 106 to operate under more fuel-rich conditions. Due to the engine 106 generating substantial amounts of hydrogen and carbon monoxide, an exhaust gas recirculation system is incorporated to supply hydrogen, thus enabling richer operation. In the illustrated embodiment of FIG. 5, the syngas production system 100 includes a recirculation channel 192 extending from an output 194 of the catalytic converter 128 to the intake manifold 112 of the engine 106. The recirculation channel 192 is configured to feed at least a portion of the tail gas 160 containing hydrocarbons and hydrogen from the catalytic converter 128 to the intake manifold 112 of the engine 106, to mix at least a portion of the tail gas 160 with the heated fuel mixture 122. Alternatively, as illustrated in dashed line, the recirculation channel 192 may be configured to feed at least a portion of the tail gas 160 containing hydrocarbons and hydrogen from the catalytic converter 128 to the mixing unit 102. In this instance, the mixing unit 102 is configured to mix at least a portion of the tail gas 160 with the hydrocarbon fuel 144, the oxidant 146, and the water 148 to generate the fuel mixture 116. In some embodiments, the tail gas 160 may be compressed before feeding into either the engine 106 or the mixing unit 102.

In the illustrated embodiment of FIG. 6, the syngas production system 200 includes a recirculation channel 202 extending from an output 204 of the condenser 136 to the intake manifold 112 of the engine 106. The recirculation channel 202 is configured to feed at least a portion of the separated improved ratio syngas 150 containing hydrogen to the intake manifold 112 of the engine 106, to mix at least a portion of the separated improved ratio syngas 150 with the heated fuel mixture 122. Alternatively, as illustrated in dashed line, the recirculation channel 202 may be configured to feed at least a portion of the separated improved ratio syngas 150 to the mixing unit 102. In this instance, the mixing unit 102 is configured to mix at least a portion of the separated improved ratio syngas 150 with the hydrocarbon fuel 144, the oxidant 146, and the water 148 to generate the fuel mixture 116. In some embodiments, the separated improved ratio syngas 150 may be compressed before feeding into either the engine 106 or the mixing unit 102.

Figure 7:
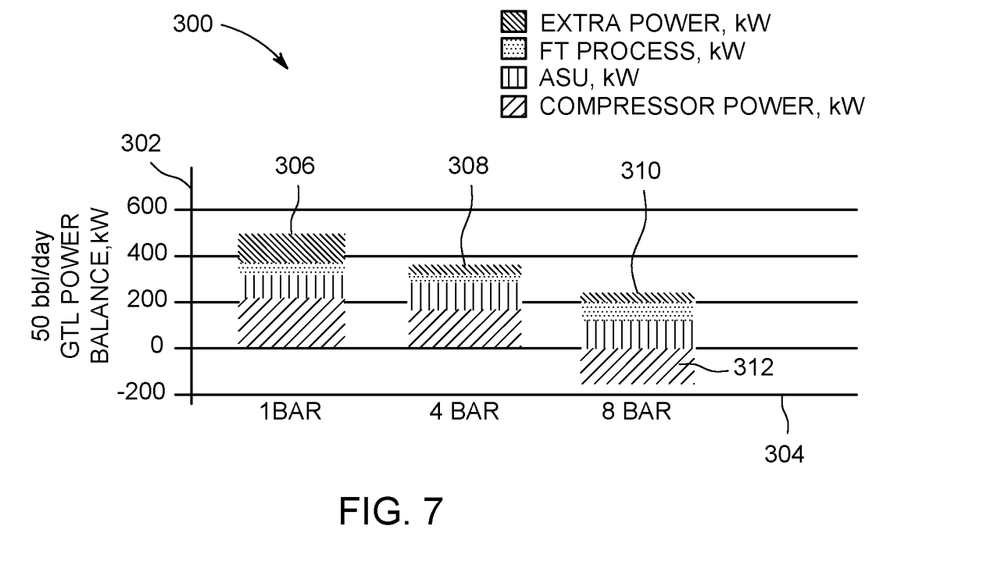
FIG. 7 shows a graph representative of variation in electricity balance for a syngas production system including a first engine type as a function of back pressure that is put on the engine, in accordance with one or more embodiments shown or described herein.
Figure 8:
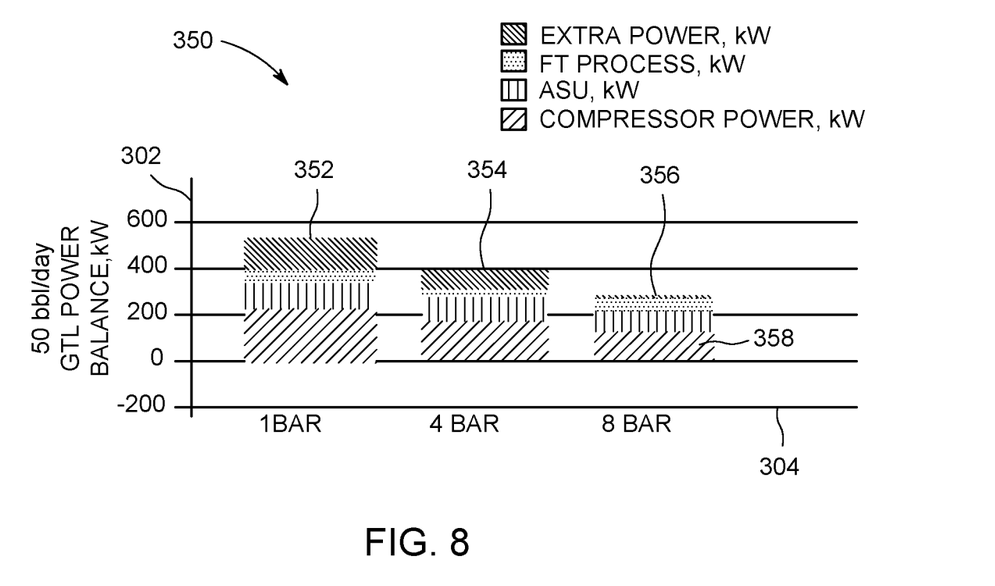
FIG. 8 shows a graph representative of variation in electricity balance for a syngas production system including another engine type as a function of back pressure that is put on the engine in accordance with one or more embodiments shown or described herein.

FIGS. 7 and 8 show graphs 300, 350, respectively, representative of electricity balance, plotted along y-axis 302, for a fuel conversion system as disclosed herein for a first engine (FIG. 7) and a second engine (FIG. 8) as a function of back pressure, plotted along x-axis 304, that is put on the engine. As previously described with regard to FIG. 3, applying back pressure on the engine reduces size (and cost) of the compressors, such as the plurality of compressors 138 of FIGS. 2-6, because the syngas exits the engine at a higher pressure. Applying backpressure on the engine also reduces the amount of power that the engine produces. As graphically illustrated in FIGS. 7 and 8, there are three major contributors to the power consumption by the fuel conversion systems disclosed herein: the air separation unit (ASU) or air purifier, the compressor, and the remaining components of the system. As illustrated in the engine of FIG. 7, at 1 bar back pressure on the engine, plotted at 306, 4 bar back pressure on the engine plotted at 308, and at 8 bar back pressure on the engine plotted at 310, the power consumption of the ASU and the remaining components of the system remain constant, but compression power is reduced as the back pressure is increased.

Similarly, as illustrated in the engine of FIG. 8, at 1 bar back pressure on the engine plotted at 352, 4 bar back pressure on the engine plotted at 354, and at 8 bar back pressure on the engine plotted at 356, the power consumption of the ASU and the remaining components of the system remain constant, but the compression power is reduced as the back pressure is increased. Operation of the first engine of FIG. 7 at 8 bar back pressure results in overall power deficiency (power becomes negative) as plotted at 312, so the highest back pressure that can be applied to this engine is 4 bar. For the engine of FIG. 8, a breakeven point, plotted at 358, is reached at 8 bar back pressure.

Figure 9:
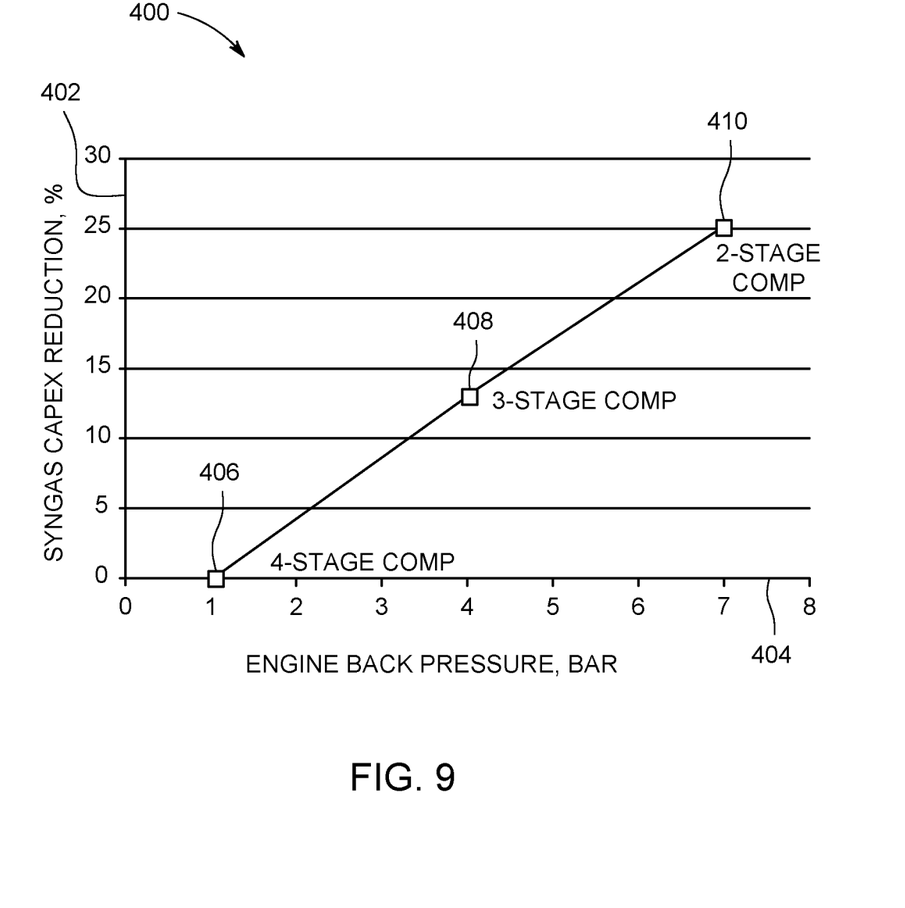
FIG. 9 shows a graph representative of variation in a reduction in syngas CAPEX reduction as a result of the application of engine back pressure, in accordance with one or more embodiments shown or described herein.

As previously described, and as best illustrated in FIG. 9, applying back pressure on the engine provides a reduction in size and cost of the syngas compressors, such as the plurality of compressors 138 of FIGS. 2-6, one of the biggest contributors to the energy consumption and cost of syngas production. FIG. 9 shows a graph 400 representing the percentage of capital expenditure (CAPEX) reduction, plotted along y-axis 402 as it relates to the engine back pressure, plotted along the x-axis 404. As illustrated, at an engine back pressure of less than 2 bar, a 4-stage compressor is required, as indicated at point 406. At an engine back pressure of approximately 4 bar, a 3-stage compressor is required, as indicated at point 408, with a CAPEX reduction of approximately 12%. At an engine back pressure of approximately 7 bar, a 2-stage compressor is required, as indicated at point 410, with a CAPEX reduction of approximately 25%. Thus, it may be observed from the graph 400 that, as the back pressure put on the engine is increased, the fewer number of compressor stages are required.

Described is a novel system for syngas production using a spark ignition engine. The system is integrated with the Fischer-Tropsch (FT) process for production of gasoline diesel, methanol, and/or other valuable products. Premixed fuel rich natural gas—air or the oxygen air (oxygen, nitrogen and optionally steam) mixture is combusted in internal combustion engine to produce syngas. The engine is integrated with water gas shift reactor to improve the $H_2$:CO ratio in syngas. Commercial advantage of the proposed technology exists in the reduced cost of syngas production. Estimates show that CAPEX of syngas production using engine is significantly lower than state of the art technologies such as steam and auto-thermal reforming. The proposed technology is based on the use of existing equipment and can be used for dual syngas and power production.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. A system comprising:
a mixing unit configured to mix a hydrocarbon fuel, an oxidant and water to generate a fuel mixture;
a heat exchanger coupled to the mixing unit and configured to receive the fuel mixture and evaporate the water by heating the fuel mixture, using a hot fluid, to generate a heated fuel mixture;
an engine coupled to the heat exchanger and configured to receive the heated fuel mixture and generate an exhaust syngas comprised of hydrogen, carbon monoxide and water vapor by partially combusting the heated fuel mixture; and
a water gas shift (WGS) reactor coupled to the engine and configured to receive the exhaust syngas and provide a water gas shift reaction of the hydrogen ($H_2$), carbon monoxide (CO) and the water vapor in the exhaust syngas to provide a reduction in a level of carbon monoxide (CO) in the exhaust syngas and an increase in a level of hydrogen ($H_2$) in the exhaust syngas to generate an improved syngas, wherein the improved syngas has a higher hydrogen ($H_2$) to carbon monoxide (CO) ratio ($H_2$:CO ratio) than the exhaust syngas.

2. The system of claim 1, wherein the exhaust syngas has a hydrogen ($H_2$) to carbon monoxide (CO) ratio ($H_2$:CO ratio) of less than 2:1 and the improved syngas has a hydrogen ($H_2$) to carbon monoxide (CO) ratio ($H_2$:CO ratio) of at least 2:1.

3. The system of claim 1, further comprising an oxygen source coupled to the engine, wherein the oxygen source provides a slipstream of oxygen to the engine to provide a fuel air mixture operating at a stoichiometric point whereby substantially all of the oxidant in the heated fuel mixture is consumed and all of the hydrocarbon fuel in the heated fuel mixture is burned.

4. The system of claim 1, further comprising a condenser coupled to the water gas shift (WGS) reactor through a manifold, wherein the condenser is configured to receive the improved syngas from the water gas shift (WGS) reactor through the manifold and generate a separated improved syngas and condensed water from the improved syngas by a condensation process.

5. The system of claim 4, wherein the manifold extends from the water gas shift (WGS) reactor to the condenser through the heat exchanger, wherein the manifold is configured to transfer the hot fluid in heat exchange relationship with the fuel mixture.

6. The system of claim 4, further comprising a recirculation channel coupled to the condenser and the mixing unit, wherein the recirculation channel is configured to circulate at least a portion of the separated improved syngas from the condenser to the mixing unit to generate the fuel mixture.

7. The system of claim 4, further comprising a recirculation channel coupled to the condenser and the engine, wherein the recirculation channel is configured to circulate at least a portion of the separated improved syngas from the condenser to the engine.

8. The system of claim 4, further comprising at least one compressor coupled to the condenser and configured to compress the separated improved syngas to produce a pressurized separated improved syngas.

9. The system of claim 8, further comprising a catalytic converter coupled to the at least one compressor and configured to receive the pressurized separated improved syngas from the at least one compressor and generate a liquid fuel and a tail gas from the pressurized separated improved syngas by a catalytic reaction.

10. The system of claim 9, further comprising a recirculation channel coupled to the catalytic converter and the mixing unit, wherein the recirculation channel is configured to circulate at least a portion of the tail gas from the catalytic converter to the mixing unit to generate the fuel mixture.

11. The system of claim 9, further comprising a recirculation channel coupled to the catalytic converter and the engine, wherein the recirculation channel is configured to circulate at least a portion of the tail gas from the catalytic converter to the engine.

12. A system comprising:
a mixing unit configured to mix a hydrocarbon fuel, an oxidant and water to generate a fuel mixture;
a heat exchanger coupled to the mixing unit and configured to receive the fuel mixture and evaporate the water by heating the fuel mixture, using a hot fluid, to generate a heated fuel mixture;
an engine coupled to the heat exchanger and configured to receive the heated fuel mixture and generate an exhaust syngas comprised of hydrogen, carbon monoxide and water vapor by partially combusting the heated fuel mixture, wherein the exhaust syngas has a hydrogen ($H_2$) to carbon monoxide (CO) ratio ($H_2$:CO ratio) less than 2:1; and
a water gas shift (WGS) reactor coupled to the engine and configured to receive the exhaust syngas and provide a water gas shift reaction of the hydrogen ($H_2$), carbon monoxide (CO) and the water vapor in the exhaust syngas to provide a reduction in a level of carbon monoxide (CO) in the exhaust syngas and an increase in a level of hydrogen ($H_2$) in the exhaust syngas to generate an improved syngas, wherein the improved syngas has a hydrogen ($H_2$) to carbon monoxide (CO) ratio ($H_2$:CO ratio) of at least 2:1.

13. The system of claim 12, further comprising an oxygen source coupled to the engine, wherein the oxygen source provides a slipstream of oxygen to the engine to provide a fuel air mixture operating at a stoichiometric point whereby substantially all of the oxidant in the heated fuel mixture is consumed and all of the hydrocarbon fuel in the heated fuel mixture is burned.

14. The system of claim 12, further comprising a condenser coupled to the water gas shift (WGS) reactor through a manifold, wherein the condenser is configured to receive the improved syngas from the water gas shift (WGS) reactor through the manifold and generate a separated improved syngas and condensed water from the improved syngas by a condensation process.

15. The system of claim 14, wherein the manifold extends from the water gas shift (WGS) reactor to the condenser through the heat exchanger, wherein the manifold is configured to transfer the hot fluid in heat exchange relationship with the fuel mixture.

16. The system of claim 14, further comprising a recirculation channel configured to circulate at least a portion of the separated improved syngas from the condenser to at least one of the mixing unit and the engine to generate the fuel mixture.

17. The system of claim 14, further comprising at least one compressor coupled to the condenser and configured to compress the separated improved syngas to produce a pressurized separated improved syngas.

18. The system of claim 17, further comprising a catalytic converter coupled to the at least one compressor and configured to receive the pressurized separated improved syngas from the at least one compressor and generate a liquid fuel and a tail gas from the pressurized separated improved syngas by a catalytic reaction.

19. The system of claim 18, further comprising a recirculation channel coupled to the catalytic converter configured to circulate at least a portion of the tail gas from the catalytic converter to at least one of the mixing unit and the engine to generate the fuel mixture.

20. A method comprising:
mixing a hydrocarbon fuel, an oxidant and water in a mixing unit, to generate a fuel mixture;
evaporating the water by heating the fuel mixture, using a hot fluid in a heat exchanger, to generate a heated fuel mixture;
generating an exhaust syngas in an engine by partially combusting the heated fuel mixture in the engine; and
generating an improved syngas in a water gas shift (WGS) reactor by providing a water gas shift reaction of the hydrogen ($H_2$), carbon monoxide (CO) and the water vapor in the exhaust syngas to provide a reduction in a level of carbon monoxide (CO) in the exhaust syngas and an increase in a level of hydrogen ($H_2$) in the exhaust syngas, wherein the improved syngas has a higher hydrogen ($H_2$) to carbon monoxide (CO) ratio ($H_2$:CO ratio) than the exhaust syngas.

21. The method of claim 20, further comprising:
providing a slipstream of oxygen to the engine to provide a fuel air mixture operating at a stoichiometric point whereby substantially all of the oxidant in the heated fuel mixture is consumed and all of the hydrocarbon fuel in the heated fuel mixture is burned.

22. The method of claim 20, further comprising:
receiving the improved syngas from the water gas shift (WGS) reactor in a condenser, through a manifold; and
generating a separated improved syngas and condensed water from the improved syngas by a condensation process, in the condenser.

23. The method of claim 22, further comprising:
circulating at least a portion of the separated improved syngas from the condenser to at least one of the mixing unit and the engine to generate the fuel mixture.

24. The method of claim 21, further comprising transferring the improved syngas from the water gas shift (WGS) reactor in heat exchange relationship with the fuel mixture in the heat exchanger to heat the fuel mixture.

25. The method of claim 22, further comprising:
compressing the separated improved syngas in at least one compressor, to produce a pressurized separated improved syngas; and
generating a liquid fuel and a tail gas from the pressurized separated improved syngas in a catalytic converter, by a catalytic reaction.

26. The method of claim 25, further comprising:
circulating at least a portion of the tail gas from the catalytic converter to at least one of the mixing unit and the engine to generate the fuel mixture.

27. The method of claim 25, further comprising:
applying back pressure on the engine to reduce a number of required compressors.

* * * * *